United States Patent [19]

Boggs et al.

[11] 4,035,036

[45] July 12, 1977

[54] NOISE SUPPRESSING ELEMENT FOR CONTINUOUS TRACK OF CRAWLER TYPE VEHICLE AND METHOD OF OPERATING SAME

[75] Inventors: Roger L. Boggs, East Peoria; Eugene R. Groff, Chillicothe; Paul L. Wright, Peoria, all of Ill.

[73] Assignee: Caterpillar Tractor Co., Peoria, Ill.

[21] Appl. No.: 622,206

[22] Filed: Oct. 14, 1975

[51] Int. Cl.² .................................... B62D 55/20
[52] U.S. Cl. ................................................ 305/57
[58] Field of Search .............. 305/57, 52; 74/229, 74/230.1, 247, 245 R; 308/18, 20; 29/125; 16/31 R

[56] References Cited

U.S. PATENT DOCUMENTS

| | | | |
|---|---|---|---|
| 1,339,298 | 5/1920 | Steele | 305/57 |
| 1,513,459 | 10/1924 | Jett | 305/57 X |
| 2,190,336 | 2/1940 | Olson | 308/20 |
| 2,444,088 | 6/1948 | Becker | 74/230.1 X |
| 2,801,461 | 8/1957 | Küsters | 29/125 X |
| 3,887,244 | 6/1975 | Haslett et al. | 305/57 |

Primary Examiner—Robert B. Reeves
Assistant Examiner—John P. Shannon
Attorney, Agent, or Firm—Frank L. Hart

[57] ABSTRACT

A rotatable resilient contacting element attachable to track shoes of a crawler type vehicle.

3 Claims, 5 Drawing Figures

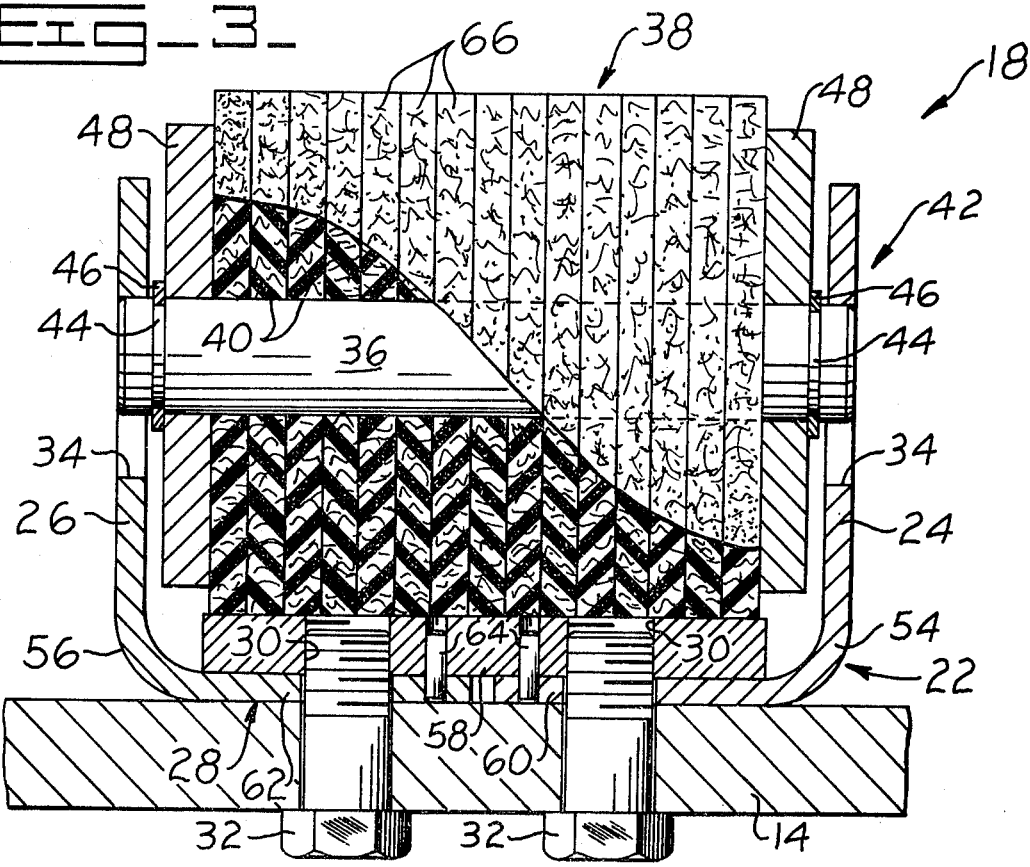
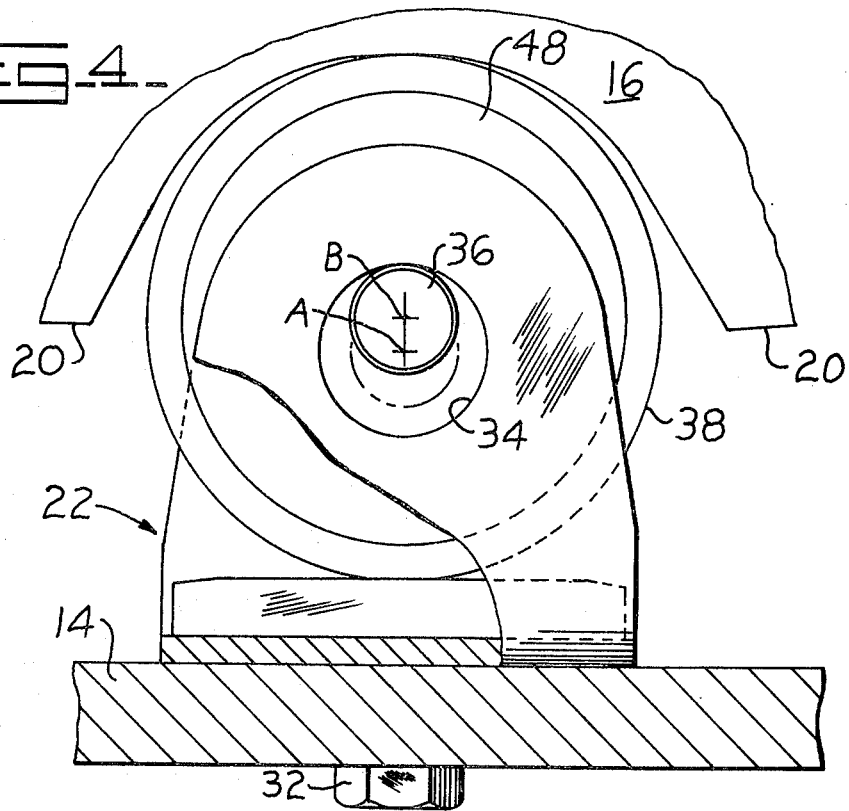

NOISE SUPPRESSING ELEMENT FOR CONTINUOUS TRACK OF CRAWLER TYPE VEHICLE AND METHOD OF OPERATING SAME

BACKGROUND OF THE INVENTION

Conventional continuous tracks for use with track-type vehicles such as crawler tractors comprise a series of track links interconnected by pins fitted with an external bushing. In such a construction, the track links have an inner rail surface upon which the track rollers and idler wheels roll. The pin and bushing connections of these conventional prior art structures provide a drive means for coaction with a chain-driving sprocket whereby the track is forcibly driven by rotational movement of the sprocket.

Although such a track construction has gained wide acceptance, it is subject to several shortcomings, such as noise created by the bushings impacting upon the drive sprocket and the rail surfaces impacting on the idler. Such conventional structures are also subjected to a high rate of wear and power losses due to these impactions and due also to the scrubbing action of the bushings against the sprocket as the track is driven.

A recent development in the art of endless tracks for track-type vehicles is the provision of a drive lug located on the track shoes intermediate the pin and bushing connections to assist the bushings in driving the track. Although these mid-pitch drive lugs have been somewhat effective in substantially eliminating a number of the disadvantages associated with conventional endless tracks, other disadvantages, such as high noise and wear levels, have not been desirably overcome. Exemplary of prior art attempts to reduce noise, wear and other shortcomings of endless track assemblies include U.S. Pat. No. 3,887,244 which issued to G. M. Haslett et al. on June 3, 1975, from an application filed Nov. 30, 1973.

Although the apparatus of that patent functions satisfactorily for suppressing noise, its wear life is somewhat less than a desirable period of time.

This invention therefore resides in apparatus and method for suppressing noise of a continuous track of a crawler type vehicle.

BRIEF DESCRIPTION OF THE DRAWINGS

FIG. 3 is a diagrammatic frontal view of the apparatus of this invention; and

FIG. 4 is a diagrammatic end view of the apparatus of FIG. 3.

DETAILED DESCRIPTION OF THE INVENTION

Figure 1:
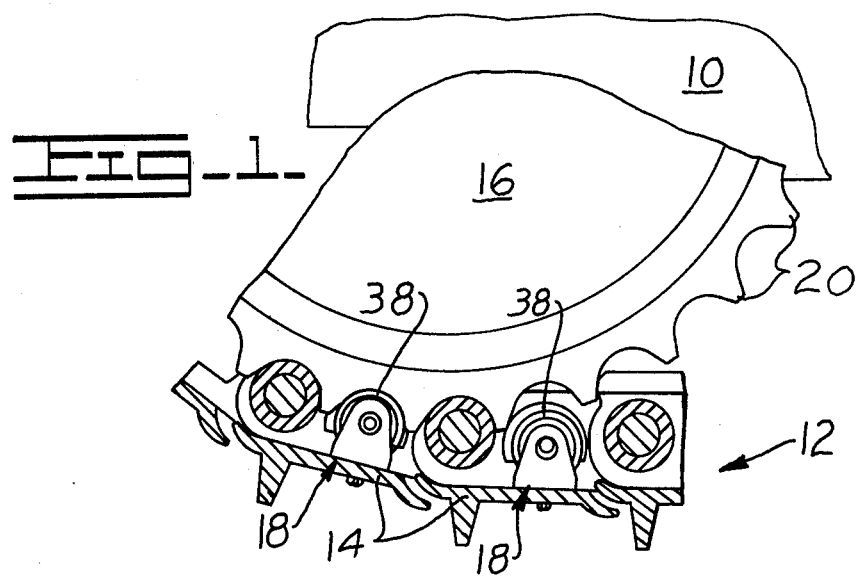
FIGS. 1 and 1A are diagrammatic views of a portion of the track of a crawler type vehicle having the apparatus of this invention.
Figure 1A:
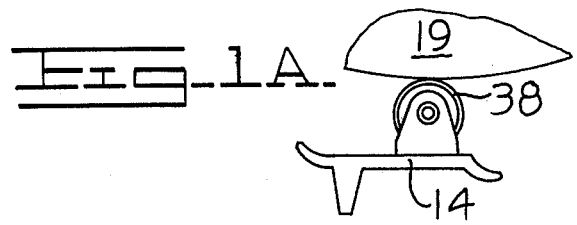
Figure 2:
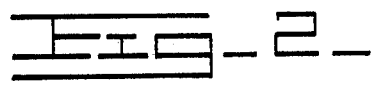
FIG. 2 is a diagrammatic enlarged view of a portion of FIG. 1.
Figure 2:
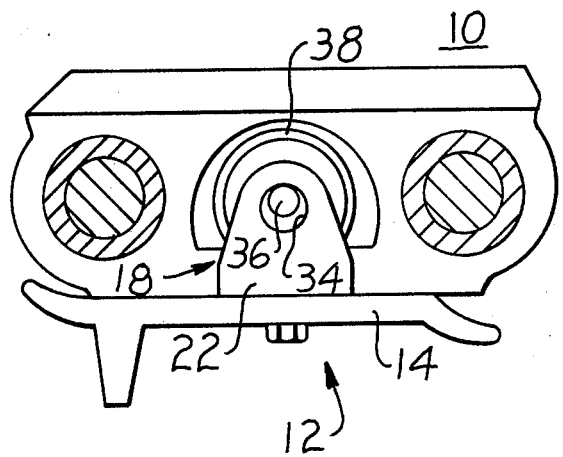

Referring to FIGS. 1, 1A, and 2, a crawler type vehicle 10 has a continuous track 12 formed of a plurality of interconnected track shoes 14. The track 12 is driven by a sprocket wheel 16, as is known in the art.

THe noise suppressing assembly 18 of this invention is connectable to a surface of a track shoe 14 for suppressing noise responsive to contact of the track 12 by the driving sprocket 16. The noise suppressing assemblies 18 are positioned at locations on the track shoes 14 for contacting track wheels 19 (FIG. 1A) and/or the sprocket 16 (FIG. 1) at locations between the sprocket teeth 10.

Referring to FIGS. 3 and 4, the noise suppressing assembly 18 has a frame 22 having first and second upright elements 24, 26 and a base 28 having at least one opening 30 extending therethrough for connecting the frame 22 to a track shoe 14 by a bolt 32 for example. Each of the upright elements 24, 26 have an opening 34 for receiving an axle 36 of the assembly 18.

A resilient contacting element 38 is mounted about the axle 36. The contacting element 38 is of general columnar transverse cross-sectional configuration and has a central opening 40 extending longitudinally therethrough for receiving the axle 36.

The contacting element 38 has a length sufficient for positioning the element 38 between the frame uprights 24, 26 and spanning the thickness of the sprocket teeth 20. The outside diameter of the contacting element is of a size sufficient for contacting the sprocket 17 with an outer surface of the element 38 and contacting an adjacent structure, for example a portion of the frame 22, with an opposed surface of the element 38.

The axle 36 has a diameter substantially, sufficiently smaller than the diameter of the frame openings 34 and/or the axle 36 has a diameter substantially, sufficiently smaller than the diameter of the central opening 40 of the contacting element 38 for transverse and rotatable movement of the contacting element 38 relative to the frame 22.

Means 42 is provided for maintaining the axle 36 within the frame openings 34. This means 42 can be of various construction. In the preferred embodiment shown, the axle 36 has an annular groove 44 formed on opposed ends of the axle 36 for receiving a retaining ring 46. Washers 48 are positioned about the axle 36 each at a location between a respective retainer ring 46 and the contacting element 38. Each of the washers 48 have an outside diameter greater than the adjacent frame opening 34 and an inside diameter less than the outside diameter of the respective retaining ring 46.

The frame 22 can be a unitary element or be a composite frame formed of a plurality of elements. The frame 22 is of general U configuration and has a base 28 having openings extending therethrough for receiving bolts 32 and connecting the frame 22 to a track shoe 14. The preferred frame 22, as shown in FIG. 3, is formed of first and second separate frame elements 54, 56 each of a general L configuration. Each element 54, 56 has a leg having an opening for receiving a bolt 32 for connecting the frame elements 54, 56 to the shoe 14. The frame elements 54, 56 can be connected to the shoe 14 with the element legs extending outwardly and away from one another or with said legs extending toward one another with the ends of the legs being adjacent one another.

In the preferred construction shown in FIG. 3, the frame legs extend toward one another and a holding element 58 overlies the leg ends 60, 62 and is connected to said leg ends. Openings can be formed through the leg ends 60, 62 and the holding element 58 for receiving pins 64 through respective coaxial openings of the holding element 58 and legs 60, 62.

Referring to FIGS. 1 and 1A, the outside diameter of the contacting element 38 is of a size sufficient for compression of the contacting element in response to contacting the track wheels 19 and/or sprocket 16. In order to reduce wear of the contacting element 38, said element is rotatable as set forth above and as hereinafter more fully described and is formed of a plurality of separate discs 66 (FIG. 3). The wear life of the contacting element 38 is improved by the unique connection of the element 38 to the shoe 14. By rotatably connecting the element 38 and sizing the elements of the assembly as set forth above, the contacting element 38 will rotate through a few degrees in response to the impact subjected upon the element 38 by the wheel 19 and/or sprocket 16.

In the operation of the apparatus of this invention, the contacting element 38 outer diameter is of a size sufficient for positioning the axis B of the contacting element generally spaced upwardly from an axis A of the frame opening 34 with a surface of the contacting element 38 being supported by an underlying structure, as for example the frame 22 and as shown in FIG. 4. In response to forces exerted in the contacting element 38 by the sprocket 16, the noise suppressing contacting element 38 is compressed and the surface in contact with the frame 22 becomes flattened and the axis B of the contacting element 38 moves toward point A, as shown by broken lines. During compression of the element 38 and/or subsequent release from contact with the sprocket 16 or wheel 19, the contacting element 38 is caused to rotate a few degrees about its axis, thereby presenting a different surface for contact by the wheel or sprocket in response to subsequent movement. By this function of rotation of the contacting element 38, the operational life of the contacting element is markedly increased.

Other aspects, objects, and advantages of this invention can be obtained from a study of the drawings, the disclosure and appended claims.

What is claimed is:

1. A noise suppressing assembly connectable to a track shoe of a continuous track of a crawler type vehicle, comprising:
    a frame having first and second spaced uprights and being connectable to a track shoe, said uprights each having an opening therethrough, said frame including:
        first and second elements each of a general L-configuration, each element having a leg extending from the associated upright with said legs each having an opening therethrough for connecting the first and second frame elements to a track shoe with ends of the frame legs adjacent one another,
        a holding element overlying the leg ends and having openings therethrough substantially coaxial with the openings of the leg ends; and
        a pin extending through each of the coaxial openings for connecting the first and second frame elements;
    a resilient contacting element having a generally columnar cross-sectional configuration, a central opening extending therethrough, and an outside diameter sufficient for contacting one of a sprocket and a track wheel with an outer surface of the element and adjacent structure on an opposed outer surface of the element in the installed position on a track shoe;
    an axle extending through the frame openings and the central opening for connecting the contacting element to and between the frame uprights, said axle having a diameter substantially, sufficiently smaller than at least one of the diameter of the frame openings and the diameter of the central opening of the contacting element for transversely and rotatably moving the contacting element relative to the frame in response to contact of the contacting element with one of the sprocket and wheel track; and
    connecting means for maintaining the axle within the frame openings.

2. Apparatus, as set forth in claim 1, wherein the resilient contacting element is formed of a plurality of separate discs.

3. Apparatus, as set forth in claim 1, wherein the connecting means comprises an annular groove formed on opposed ends of the axle;
    a retaining ring positioned in each axle groove; and
    a washer positioned about the axle between each retaining ring and the contacting element, said washers each having an outside diameter greater than the adjacent frame opening and an inside diameter less than the outside diameter of the respective retaining ring.

* * * * *